United States Patent [19]

Quinn et al.

[11] 4,170,833
[45] Oct. 16, 1979

[54] CALLIGRAPHIC ALPHABET LETTERING KIT

[76] Inventors: Cassandrasu D. Quinn; Marcel O. Vachon, both of 499 E. Broadway, South Boston, Mass. 02127

[21] Appl. No.: 843,660

[22] Filed: Oct. 19, 1977

Related U.S. Application Data

[63] Continuation-in-part of Ser. No. 750,267, Dec. 13, 1976, abandoned, which is a continuation of Ser. No. 637,876, Dec. 5, 1975, abandoned.

[51] Int. Cl.² ............................................. G09B 11/04
[52] U.S. Cl. .......................................... 35/36; 33/467
[58] Field of Search ............................ 35/36, 37, 31 B; 283/45; 33/41 R, 41 B, 104, 107 R, 108

[56] References Cited

U.S. PATENT DOCUMENTS

| | | | |
|---|---|---|---|
| 60,356 | 12/1866 | French | 35/36 X |
| 1,254,028 | 1/1918 | Coubal | 35/36 |
| 1,324,182 | 12/1919 | Spaull | 35/37 |
| 1,351,564 | 8/1920 | Gerry | 283/45 X |
| 2,043,729 | 6/1936 | Bilder | 33/104 |
| 2,579,664 | 12/1951 | Gleasman | 33/107 R |
| 2,658,279 | 11/1953 | Amundsen | 33/41 R X |
| 2,674,803 | 4/1954 | Matthes | 33/104 X |
| 2,722,055 | 11/1955 | Rader | 33/108 |
| 2,806,299 | 9/1957 | Dubas | 35/37 |
| 2,850,811 | 9/1958 | Boley | 35/37 |
| 2,883,753 | 4/1959 | Shoenmaker | 33/104 |
| 3,063,153 | 11/1962 | Stites | 33/168 R |
| 3,085,358 | 4/1963 | Hramiec | 35/31 B |
| 3,805,390 | 4/1974 | Craig | 33/27 C |

FOREIGN PATENT DOCUMENTS 376191 7/1932 United Kingdom ............... 33/107 R

*Primary Examiner*—William H. Grieb
*Attorney, Agent, or Firm*—William Nitkin

[57] ABSTRACT

A calligraphic alphabet lettering kit comprised of a layout sheet for a selected alphabet and ruling guide is disclosed with a method of self-teaching of the art of calligraphy. The ruling guide is used for ruling sets of calligraphic alphabet lettering guidelines. The guidelines correspond to the position of ascender, head, base, descender and air lines for the alphabet, the distance between the guidelines being determined by the style of the alphabet and the size of the pen nib. The ruling guide is comprised of a set of planar members each having at least one substantially straight edge and a set of scale lines printed upon its face spaced apart vertically from one another a distance corresponding to the spacing between the alphabet guidelines. Along the straight edge can optionally be v-shaped notches, the point of each notch meeting a scale line and these notches assist in the alignment of the writing instrument in exact register wit the scale lines. The layout sheet illustrates a selected calligraphic alphabet overlaid onto the guidelines showing the shape, length, and direction of each pen stroke and the angle at which the pen nib is held.

4 Claims, 8 Drawing Figures

ROMAN Capitals

8th century miniscules

UNCIALS 4 to 8

CENTURY HALF HAND

This is the Chancery

Alphabet of the 15th Century

This is the Legend Alphabet evolved about the 18th Century

Old English

FIG. 4

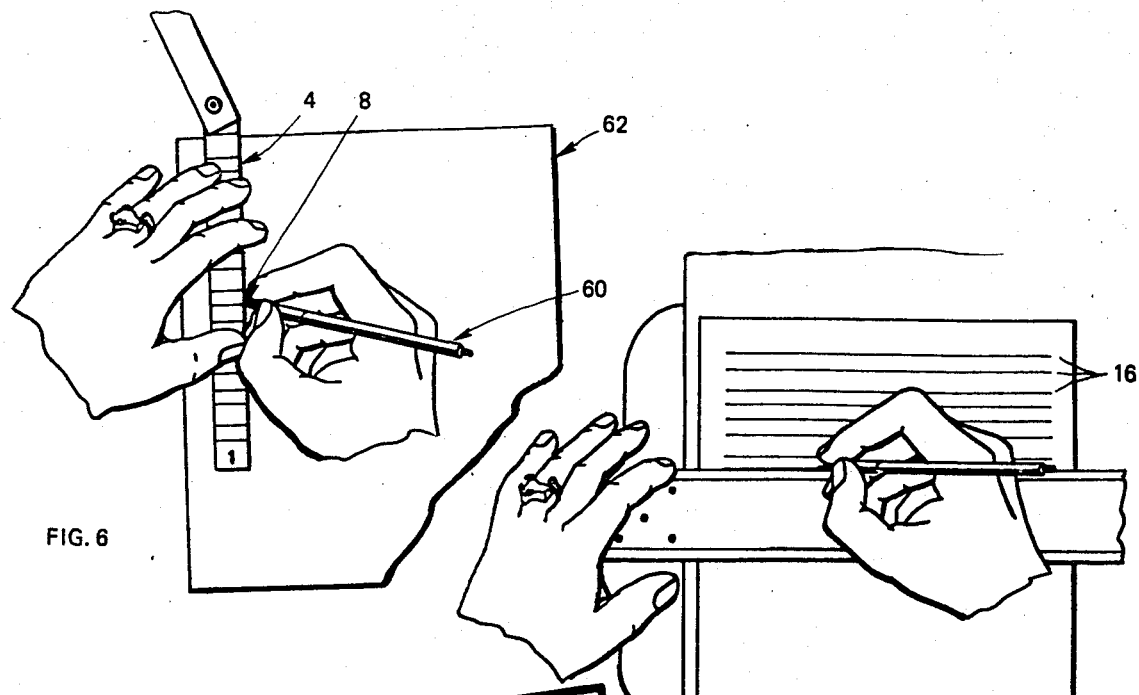
FIG. 6
FIG. 7
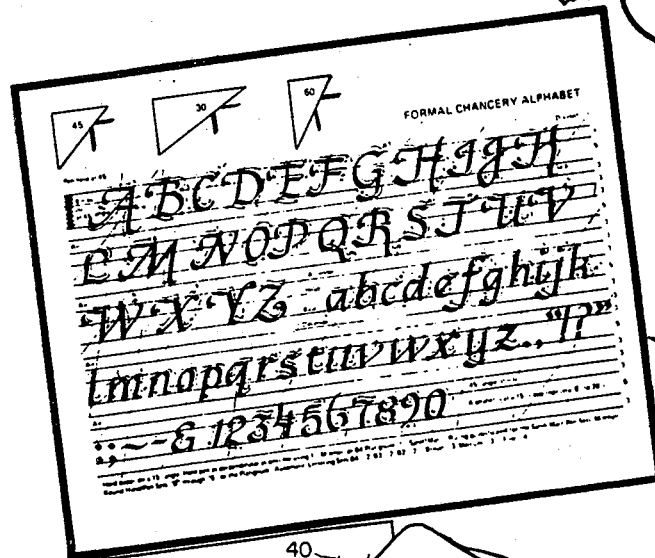
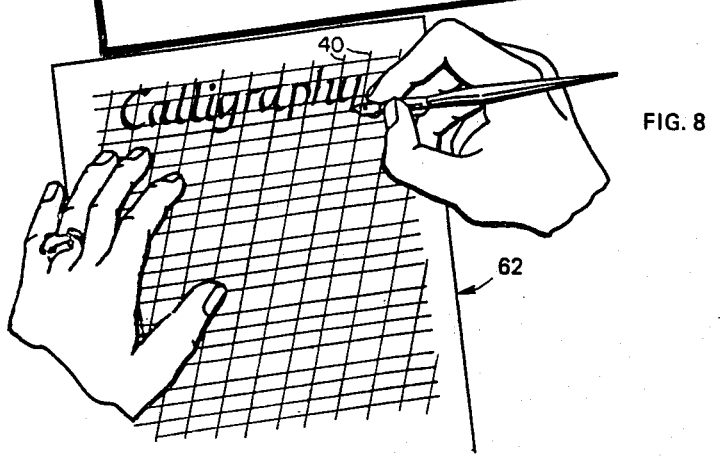
FIG. 8

CALLIGRAPHIC ALPHABET LETTERING KIT

BACKGROUND OF THE INVENTION

1. Field of the Invention

This application is a continuation-in-part of our previously filed application for Ruling Guide for Ruling Calligraphic Alphabet Guidelines, filed on 12/13/76, Ser. No. 750,267, now abandoned which is a continuation of our application of similar title, filed 12/05/75, Ser. No. 637,876, now abandoned.

The invention resides in the field of calligraphic lettering kits and more particularly relates to kits and methods for the self-teaching of calligraphy.

2. Description of the Prior Art

Calligraphy is the art of fine handwriting and differs from ordinary handwriting. In shaping letters the calligrapher considers legibility, form, size, stroke, proportion, rhythm, spacing, character and uniformity. Calligraphy had declined into almost a state of disuse through modern mechanization, but today a renewed interest is being displayed in the creation of calligraphic alphabets and the drafting of calligraphic letters.

The development of the Western Alphabet was one of evolution through the centuries from pictographs and hieroglyphics to its culmination with the Roman Alphabet in 113 A.D. The Roman Alphabet letter forms are the present day majuscules or capital letters. It took approximately eight centuries to evolve minuscules which are lowercase or small letters. The expedient use and modification of the majuscules in a hand called Uncials evolved minuscules. The alphabet which combined the majuscule Roman forms with the minuscule of the Carolingian forms is the basis for all the alphabets that have since evolved. Examples of other alphabets are the Gothic developed in the 12th century, the Chancery developed in the 15th century, and the Legend and Script developed in the 18th century.

As an artist often uses an underdrawing or underpainting with which to compose a painting, similarly the calligrapher uses guidelines upon which to draw calligraphic letters. These guidelines are called head line, base line, ascender line, descender line and air line. To determine the spacing of the guidelines for each alphabet, the calligrapher holds the pen nib at a specific angle, such as 30° or 45°, whichever the alphabet style requires, and pulls a predetermined number of strokes horizontally in a column.

The exact drawing and spacing of the above mentioned guidelines are critical to the formation of all calligraphic alphabets. At present a calligrapher must draw these guidelines using conventional ruling devices, carefully and tediously computing and measuring the spacings onto his writing surface. Further the shaping of each letter by pen now requires the learning of such techniques which is usually accomplished in a classroom setting.

The kit of this invention makes the forming of such letters and spacing of such guidelines substantially easier so that one can teach oneself this ancient art.

SUMMARY OF THE INVENTION

A kit apparatus and method of self-teaching the art of pen calligraphy of a number of calligraphic alphabets by aspiring artists of limited schooling, experience or talent in calligraphy is disclosed herein.

A layout sheet is provided being a two-dimensional layout of a selected alphabet in a linear array of such letters overlaid with means defining ascender, head, descender, air, and base guidelines which are spaced from each other in selected numbers of integral increments of pen nib widths of a pen held at a given angle. One utilizes one of a plurality of ruling guides corresponding to the layout and having similar guideline spacing adjusted to the selected pen nib width and pen angles to provide integral number spacings between guidelines in such combinations to indicate the placement of such guidelines which are drawn horizontally parallel therefrom. Selected letters from the layout can be transferred by the calligrapher to the writing surface by copying letters from the layout sheet over the guidelines. A plurality of such ruling guides can be joined together pivotally at one end and independently accessible for use in any particular calligraphy exercise.

It has been found that providing an erasable guideline grid makes the final results more attractive when such guidelines are removed and one views the finished calligraphic lettering. V-shaped notches can be optionally provided on each ruling guide at each scale line thereon corresponding to a guideline, the point of the v of the notch meeting such scale line in order to assist in the placement of the writing instrument parallel to the scale line. The ruling guide members can be made of a stiff material such as cardboard, plastic or equivalent. The layout sheets can be made of paper.

Instructions on how to use the calligraphic alphabet kit are provided with each kit.

Each ruling guide has at least one set of scale lines corresponding to guidelines, and it has been found convenient to place several sets of such scale lines of the same relation on each ruling guide so as to enable the calligrapher to position several sets of guidelines on the writing surface at one time. If another set of guidelines is desired, the ruling guide member is lowered so that the ascender scale line coincides with the mark of the air line of the set of guidelines above. This process continues until sufficient sets of guidelines marks are drawn on the writing surface. Each ruling guide member has scale lines for a single pen nib size and differs from the other ruling guide members each of which contains scale lines for other pen nib sizes. Different ruling guides are necessary for the creation of the guidelines for the various calligraphic alphabets.

Each alphabet has a different space relation between the ascender, head, base, descender and air lines. The distance between these guidelines is determined by the size of the pen nib to be used. Pen nibs come in many different widths and each width is given a specific size number, such as 0,1, 1½, 2, 2½, 3, 3½, 4, 4½, 5, 5½, and 6. The distance between the guidelines is a function of these widths. For example, in the Roman Alphabet the distance between the ascender line and the head line is three times the width of the line drawn by the pen nib where the pen nib is held at a 30° angle to the guidelines. The distance between the head line and the base line is five times the width of the line stroked by the same size pen nib held at the same 30° angle to the guidelines. The distance between the base line and the descender line is three times the width of the line stroked by the same size pen nib at the same 30° angle to the guidelines. The distance between the descender lines and the air line is one stroke of the same size pen nib held at the same 30° angle to the guidelines.

In the Uncial Alphabet, the pen nib is also held at 30° to the guidelines and the distance between the ascender line and the head line is two strokes; the distance between the head line and the base line is six strokes; the distance between the base line and the descender line is two strokes; and the distance between the descender line and air line is two strokes.

Assuming we make a formula to represent the distances between the respective guidelines where "X" represents one stroke, the distances between the guidelines of the Uncial Alphabet would be represented by the formula 2X, 6X, 2X, 2X where the pen nib is held at a 30° angle to the guidelines.

The distances between the guidelines of the Chancery Alphabet would be represented by the formula 3X, 5X, 3X, 3X where the pen nib is held at a 45° angle to the guidelines.

The distances between the guidelines of the Legend Alphabet which has no air line would be represented by 8X, 4X, 8X where the pen nib is held at a 30° angle to the guidelines.

Since the formula for each calligraphic alphabet differs, a different ruling guide is necessary for each alphabet.

BRIEF DESCRIPTION OF THE DRAWINGS

FIG. 4 illustrates a number of calligraphic alphabets and their respective guidelines and pen angle lines.

FIG. 6 illustrates a method of using a ruling guide to position guidelines points.

FIG. 7 illustrates a method of extending parallel horizontal guidelines from point positioned as shown in FIG. 6.

FIG. 8 illustrates the copying of letters from the layout sheet over the guidelines.

DESCRIPTION OF THE PREFERRED EMBODIMENT

Figures 1, 2, 3:
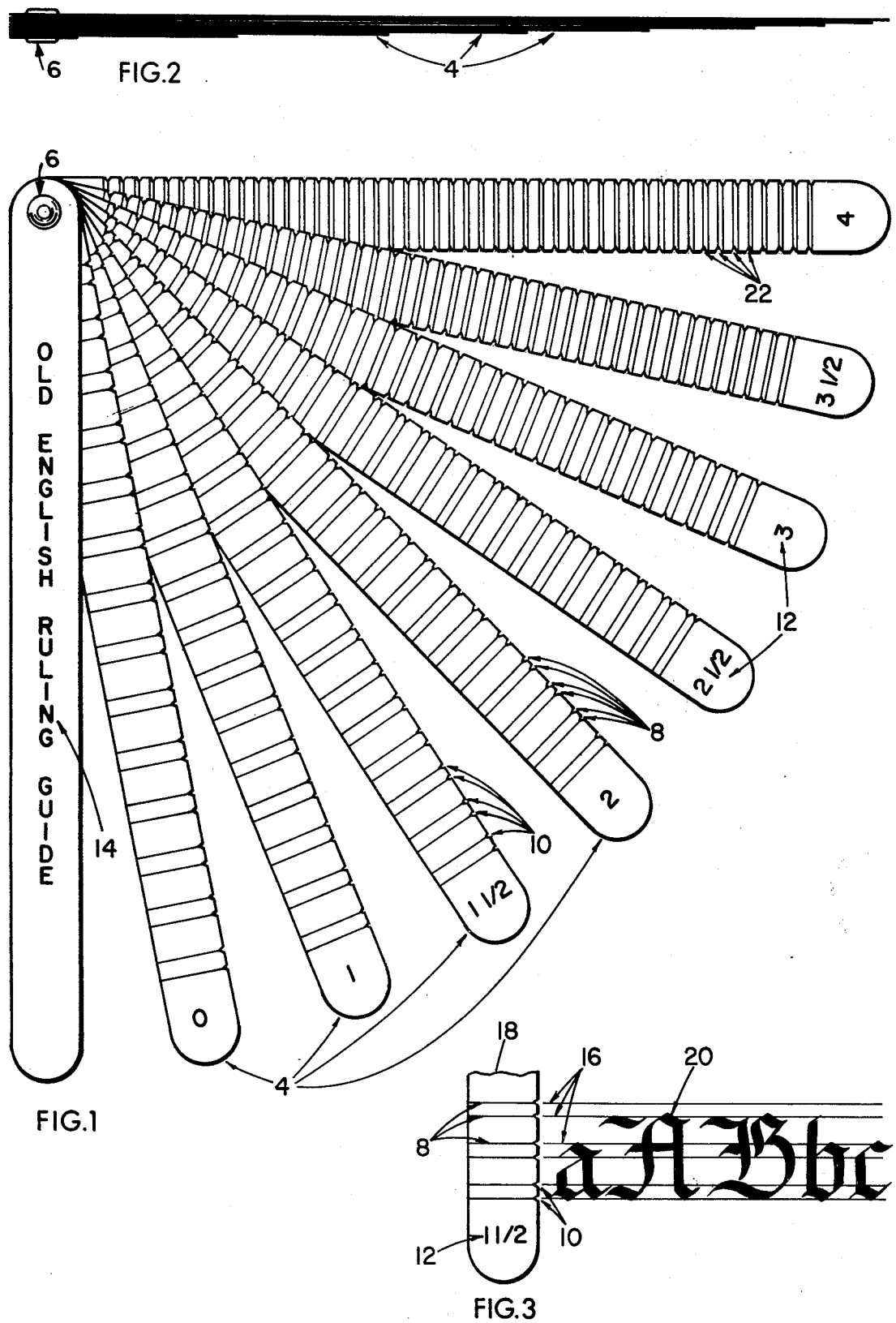
FIG. 1 is a perspective view of a ruling guide where the ruling guide members are spread apart from one another.
FIG. 2 is a side view of the device illustrated in FIG. 1.
FIG. 3 illustrates a sample set of guidelines with calligraphic letters thereon.

The kit of this invention utilizes as illustrated in FIG. 1 several planar ruling guide members 4 joined together at one end 6 where each member can be moved apart from the others. Each ruling guide member has a series of scale lines 8 on its face corresponding to calligraphic guidelines 16 in FIG. 3. At the end of each scale line 8 can optionally be located a v-shaped notch 10 into which the tip of the writing instrument is placed and this notch assists in aligning the point of the writing instrument with the scale line. Each ruling guide member has a number 12 at its base corresponding to the pen nib size for which its scale lines are spaced apart. The pen nib size numbers at the base of each column: 0, 1, 1½, 2, 2½, 3, 3½, 4, 4½, 5, 5½, and 6 are standard pen nib sizes such as are used in the William Mitchell Round Hand Pen distributed by the Pentalic Corporation of New York. On ruling guide members with scale lines for the higher numbered pen nib sizes, the notches 10, if utilized, may be on opposite sides of adjacent scale lines so that the notches will not overlap. The ruling guide can be constructed of stiff thin material such as plastic, cardboard or equivalent approximately 0.01 to 0.02 inches in thickness and can be made by any variety of mechanical means. Scale lines corresponding to the guidelines for different pen nib sizes can be printed on the front and back of each ruling guide member. It is anticipated that each ruling guide will have a label 14 designating the particular alphabet for which it should be used.

FIG. 2 illustrates the side view of the device in FIG. 1 showing the planar members 4 spread apart.

FIG. 3 shows a section 18 of a ruling guide member and a set of guidelines 16 which have been drawn using the ruling guide member 18 as a guide and calligraphic lettering 20 thereon.

FIG. 4 illustrates several sets of guidelines spaced for majuscules and minuscules of the Roman 22, Uncial 24, Chancery 26, Old English 29, and Legend 28 Alphabets. The ascender line within the Uncial Alphabet 24 is shown by numeral 30; head line, by numeral 32; base line, by numeral 34; descender line, by numeral 36; and the air line, by numeral 38. A pen angle line is illustrated by reference numeral 40.

Figure 5:
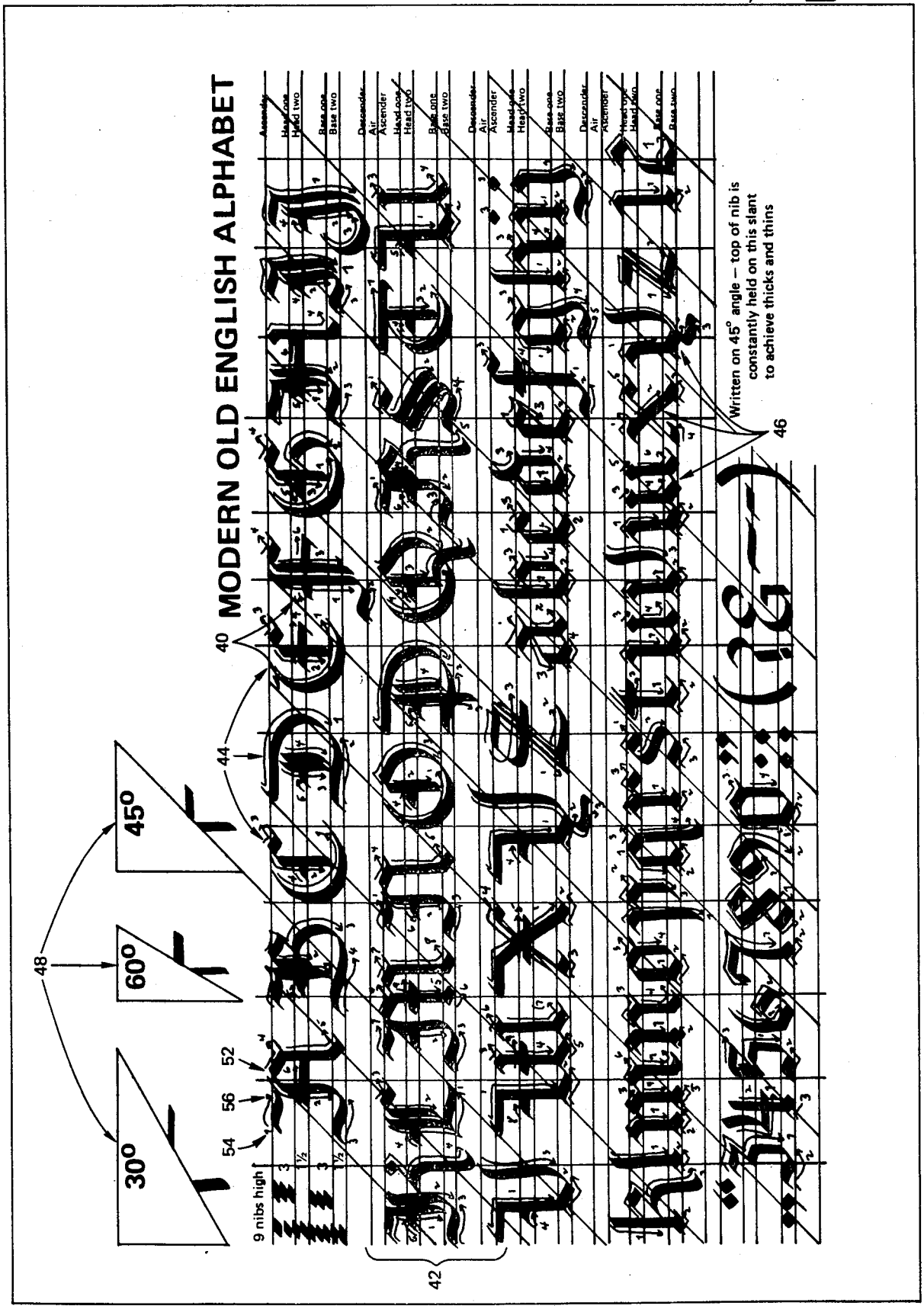
FIG. 5 illustrates a layout sheet for Old English Alphabet letters.

FIG. 5 illustrates a layout sheet 41 for the Old English calligraphic alphabet. This alphabet includes two base and two head lines. Seen is guideline grid 42 with capital letters 44 and small letters 46 printed thereon. A series of pen angle indicators 48 are shown to assist in aligning the pen for use. Pen angle lines 40 run in this alphabet at 45° to the guidelines. The particular stroking of a letter is indicated for each letter. For example in the letter "A" 52 there are six strokes done in the direction and order as each numbered line indicates. The placement and size of the resulting letter is related to the pen nib width selected and its corresponding guidelines. One makes the strokes in the order to the numbers 54 and in the direction as indicated by the line's arrow 56 for each letter, number or symbol. There is a different layout sheet for each calligraphic alphabet.

FIG. 6 illustrates the placement of marks for the positioning of guidelines by the use of a ruling guide 4 and writing instrument 60 onto a writing surface 62. Seen in this view the user of the ruling guide is placing a mark beside a scale line 8. In FIG. 7 the individual utilizing the kit is seen drawing guidelines 16 from each mark. In FIG. 8 the pen angle lines 40 are seen in position on the guideline grid and the user is following the layout sheet 41 to letter words onto the writing surface 62. The layout sheet used in this example is for the Formal Chancery Alphabet.

METHOD OF OPERATION OF THE INVENTION

The following sequence of events takes place when using the kit of this invention. First one selects the ruling guide for the alphabet one wishes to letter. The ruling guide member for the pen nib size to be used is then placed over the writing surface perpendicular to the guidelines to be drawn. The tip of a writing instrument, preferably of the erasable type, is placed beside the scale line and a mark is made on the writing surface below. The marks are then extended horizontally with a T square or other straightedge, preferably on a board, so that each line is parallel to one another. This process is repeated for each guideline desired. One then draws the vertical and/or angular pen angle lines to establish the grid necessary for lettering. One then copies each letter selected from the layout sheet in the manner indicated holding the pen at the preselected angle for that alphabet. The writing medium used should be of the nonerasable type. After the letters have dried or are otherwise completed, one erases the guidelines grid leaving the finished calligraphic artwork.

Although the present invention has been described with reference to particular embodiments, it will be apparent to those skilled in the art that variations and modifications can be substituted therefor without departing from the principles and spirit of the invention.

We claim:

1. A method of teaching and/or mechanically effecting the art of pen calligraphy in multiple calligraphic alphabets, and alphabet-pen nib-pen angle combinations by artists of limited schooling and/or experience and/or talent comprising,
   (a) providing for each of multiple calligraphic alphabets and combinations of such alphabet with pen nib and pen angle combinations, a two dimensional layout of the alphabet in running linear array and overlaid with means defining ascender, head, descender, air, and base guidelines which are spaced from each other in selected numbers of integral increments of one pen nib width of a pen held at a given angle,
   (b) further providing for each such layout similar guide spacing in equal integral number increments of different nib widths.
   (c) establishing in erasable form at least one writing assisting array of guidelines on a writing surface by use of one of said guides, the head, ascender, descender, air and base guidelines using the spacings of said guide,
   (d) erasably ruling in parallel form on said surface guidelines spaced according to said guide, selecting a pen with nib width and angle, corresponding to said guide and said two dimensional layout and using the pen to letter a linear array of letters on said writing surface over said erasable guidelines scaling from said two dimensional layout, and
   (e) wherein the parts of each letter are stroked essentially in the same sequence of line pen angle direction as in the layout.

2. Method in accordance with claim 1 wherein letter part line sequence and direction guides are also provided as overlays in each of said alphabet layouts.

3. A kit apparatus for mechanically effecting the art of pen calligraphy in multiple calligraphic alphabets and alphabet pen nib pen angle combinations, comprising,
   at least one multiple two dimensional layout of an alphabet and alphabet pen nib-pen angle combinations, in linear array of letters overlaid with means defining ascender, head, descender, air and base guidelines which are spaced from each other in selected numbers of integral increments of one pen nib width of a pen held at a given angle,
   a plurality of ruling guides corresponding to said layout and having similar guide spacings adjusted to different combinations of pen nib widths and pen angles to provide integral number spacings between guidelines in such combinations,
   whereby said layout can be transferred by the user to a writing surface by selecting one of said plural ruling guides corresponding to a given pen nib width and pen angle and the alphabet of said layout, establishing guideline spacings on said surface with said ruling guide, ruling the guidelines and copying letters from said alphabet layout over the guidelines.

4. Kit apparatus in accordance with claim 3 wherein said plural guides are joined together and independently accessible for use in particular calligraphy exercise.

* * * * *